US010186171B2

(12) United States Patent
Hoppmann et al.

(10) Patent No.: US 10,186,171 B2
(45) Date of Patent: Jan. 22, 2019

(54) ADDING SOUNDS TO SIMULATED ULTRASOUND EXAMINATIONS

(71) Applicant: UNIVERSITY OF SOUTH CAROLINA, Columbia, SC (US)

(72) Inventors: Richard Hoppmann, Columbia, SC (US); Debra Krotish, Blythewood, SC (US); Michael S. Riffle, Swansea, SC (US); Victor Rao, Columbia, SC (US); Stephen Harris, Cayce, SC (US); Duncan Howe, Hopkins, SC (US); Mary Elizabeth Poston, Columbia, SC (US)

(73) Assignee: University of South Carolina, Columbia, SC (US)

( * ) Notice: Subject to any disclaimer, the term of this patent is extended or adjusted under 35 U.S.C. 154(b) by 552 days.

(21) Appl. No.: 14/496,080

(22) Filed: Sep. 25, 2014

(65) Prior Publication Data

US 2015/0086954 A1    Mar. 26, 2015

Related U.S. Application Data

(60) Provisional application No. 61/882,695, filed on Sep. 26, 2013.

(51) Int. Cl.
*G09B 23/28* (2006.01)
(52) U.S. Cl.
CPC .................. *G09B 23/286* (2013.01)

(58) Field of Classification Search
CPC .................................................... G09B 23/286
USPC ........................................................... 434/266
See application file for complete search history.

(56) References Cited

U.S. PATENT DOCUMENTS

| 5,868,579 A * | 2/1999 | Lampotang .......... A61B 5/1106 434/266 |
| 2008/0281206 A1 | 11/2008 | Bartlett et al. |
| 2009/0099446 A1 | 4/2009 | Frigstad et al. |
| 2009/0171212 A1 | 7/2009 | Garon |
| 2009/0279708 A1 | 11/2009 | Habboushe |

(Continued)

FOREIGN PATENT DOCUMENTS

| WO | WO 02/07586 | 1/2002 |
| WO | WO 2010/093887 | 8/2010 |

(Continued)

*Primary Examiner* — Thomas Hong
(74) *Attorney, Agent, or Firm* — Dority & Manning, P.A.

(57) ABSTRACT

A system for performing audio-enhanced, simulated ultrasound examinations may generally include an ultrasound simulation device having at least one processor and associated memory. The memory may store pre-recorded audio-enhanced ultrasound data for at least one internal organ. The audio-enhanced ultrasound data may include a moving ultrasound image of the at least one internal organ along with synced audio data associated with auscultatory sounds generated by the at least one internal organ depicted within the moving ultrasound image. In addition, the system may include a display and a speaker coupled to the ultrasound simulation device. The display may be configured to display the moving ultrasound image as a trainee is performing the simulated ultrasound examination. The speaker may be configured to broadcast the synced audio data simultaneously with the display of the moving ultrasound image.

15 Claims, 3 Drawing Sheets

(56) References Cited

U.S. PATENT DOCUMENTS

| | | |
|---|---|---|
| 2010/0055657 A1 | 3/2010 | Goble et al. |
| 2010/0179428 A1 | 7/2010 | Pedersen et al. |
| 2010/0203487 A1 | 8/2010 | Cyr et al. |
| 2010/0279262 A1 | 11/2010 | Lecat |
| 2011/0306025 A1 | 12/2011 | Sheehan et al. |
| 2012/0058457 A1* | 3/2012 | Savitsky .............. G09B 23/286 434/262 |

FOREIGN PATENT DOCUMENTS

| | | |
|---|---|---|
| WO | WO 2010/126396 | 11/2010 |
| WO | WO 2011/124922 | 10/2011 |

* cited by examiner

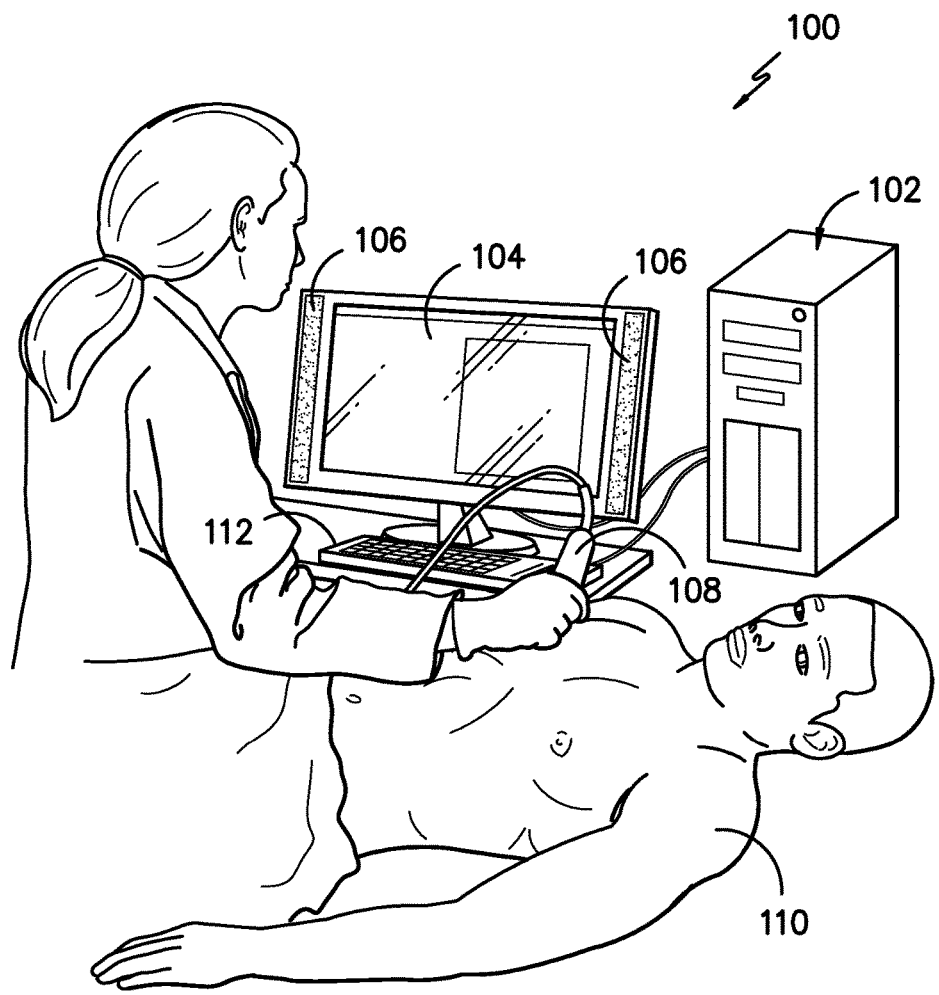
FIG. -1-

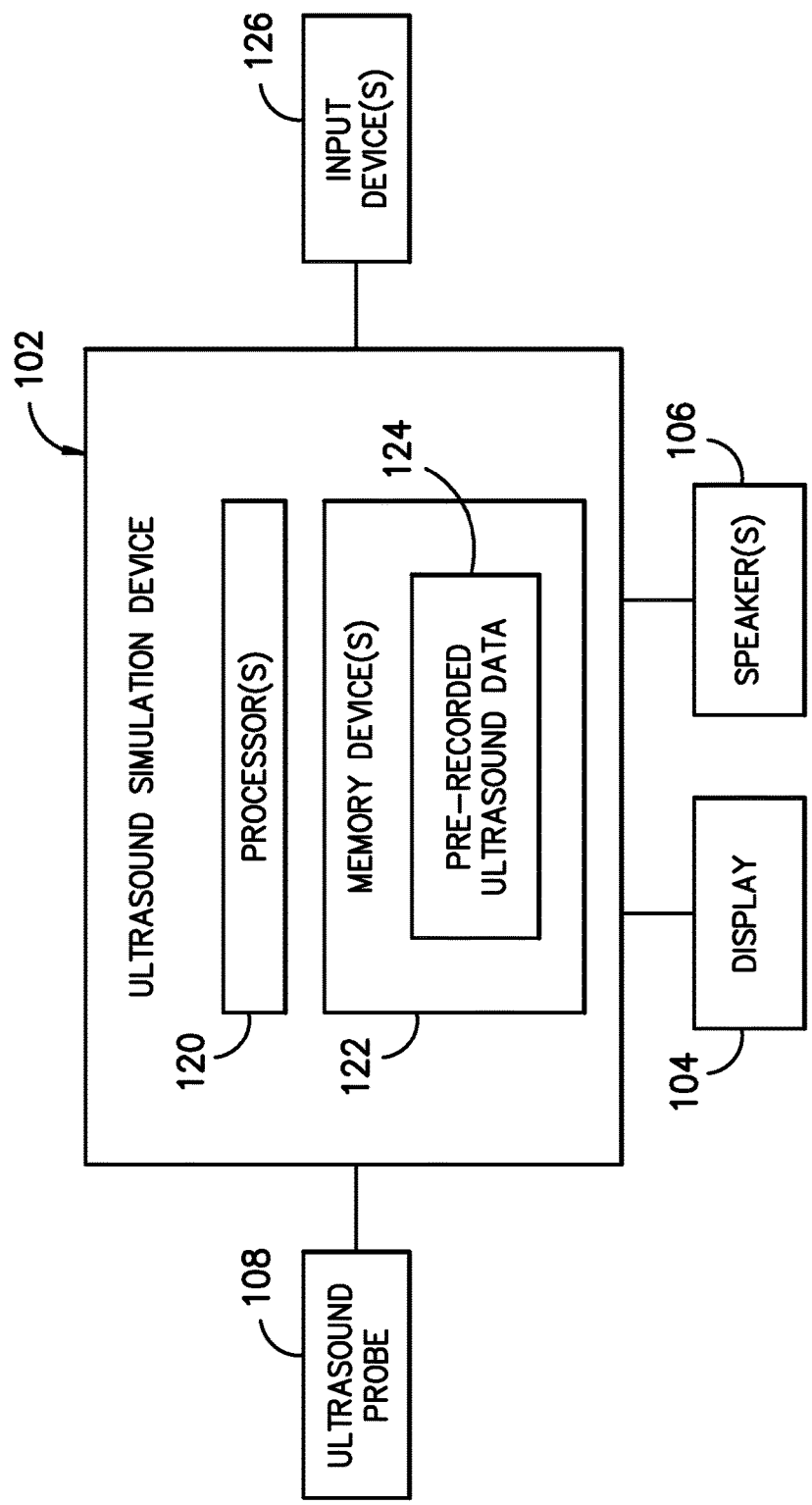
FIG. -2-

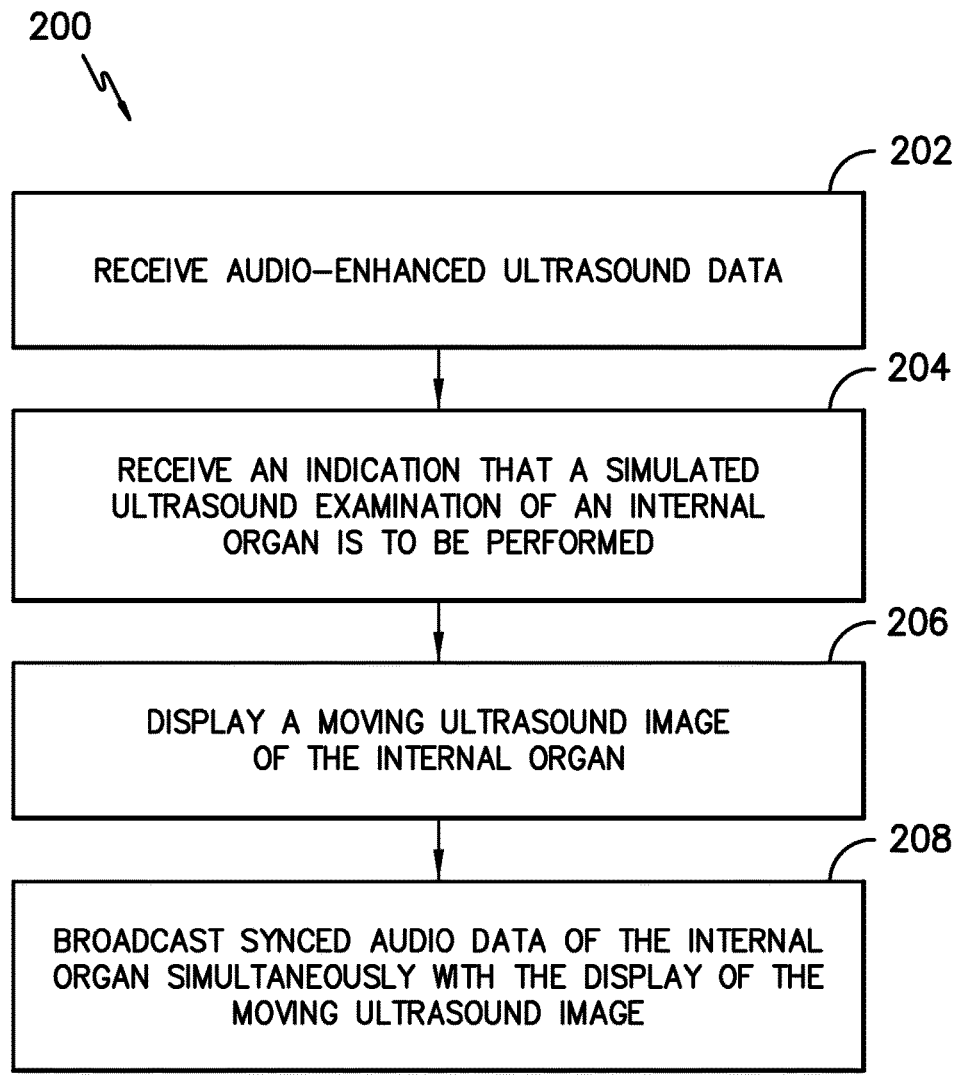
FIG. -3-

ADDING SOUNDS TO SIMULATED ULTRASOUND EXAMINATIONS

FIELD OF THE INVENTION

The present subject matter relates generally to simulated ultrasound examinations and, more particularly, to a system and method for performing simulated ultrasound examinations using audio-enhanced ultrasound data.

BACKGROUND OF THE INVENTION

Without actually performing procedures often in patients, it is difficult for a health care worker, such as a physician, to maintain the high degree of skill needed to perform these procedures or to implement new methods, operations and procedures. In addition, there is currently no way for physicians to realistically evaluate different approaches to treatment options for patient-specific situations prior to actually performing the procedures or examinations on the patient.

Systems for simulating medical procedures have provided important training tools that allow physicians to develop skills that can be transferred to the operating room. Such systems allow health care workers to practice the delicate eye-hand coordinated movements needed to navigate medical devices while viewing scanned images of a patient's anatomy on a display screen. However, current systems fail to include the sounds necessary for suitable ultrasound training.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for performing audio-enhanced, simulated ultrasound examinations. The system may generally include an ultrasound simulation device having at least one processor and associated memory. The memory may store pre-recorded audio-enhanced ultrasound data for at least one internal organ. The audio-enhanced ultrasound data may include a moving ultrasound image of the at least one internal organ along with synced audio data associated with auscultatory sounds generated by the at least one internal organ depicted within the moving ultrasound image. In addition, the system may include a display and a speaker coupled to the ultrasound simulation device. The display may be configured to display the moving ultrasound image as a trainee is performing the simulated ultrasound examination. The speaker may be configured to broadcast the synced audio data simultaneously with the display of the moving ultrasound image.

In another aspect, the present subject matter is directed to a method for performing audio-enhanced, simulated ultrasound examinations. The method may generally include receiving, with a computing device, an indication that a simulated ultrasound examination is to be performed, wherein the simulated ultrasound examination is associated with an internal organ. In addition, the method may include displaying a moving ultrasound image of the internal organ and broadcasting synced audio data simultaneously with the display of the moving ultrasound image, wherein the audio data corresponds to auscultatory sounds generated by the internal organ depicted within the moving ultrasound.

Other exemplary aspects of the present disclosure are directed to devices, systems, and methods for performing simulating ultrasound examinations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates an example view of one embodiment of a system for performing simulated ultrasound examinations using audio-enhanced ultrasound data in accordance with aspects of the present subject matter;

FIG. 2 illustrates a schematic diagram of one embodiment of various components that may be included within or coupled to an ultrasound simulation device of the disclosed system in accordance with aspects of the present subject matter; and FIG. 3 illustrates a flow diagram of one embodiment of a method for performing simulated ultrasound examinations using audio-enhanced ultrasound data in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for performing simulated ultrasound examinations using audio-enhanced ultrasound data. Specifically, in several embodiments, initial ultrasound data may be collected from actual patients or other human subjects using an ultrasound unit, together with a unidirectional microphone, to observe and examine the functioning of an internal body part, such as an internal organ. For example, the ultrasound unit and associated microphone may be used to collect a moving ultrasound image of a patient's heart along with the auscultatory sounds simultaneously generated by the heart. The resulting audio file and video image(s) produced during the examination may then be combined (e.g., using a digital recorder) to generate a moving ultrasound image(s) with accompanying, fully synched, audio sound of the examined heart.

The audio-enhanced ultrasound data collected during actual ultrasound examinations may then be utilized as a training/learning tool during the performance of manikin-based ultrasound simulations. For example, the audio-enhanced ultrasound data may be stored within an ultrasound simulation device used to facilitate the performance of simulated ultrasound examinations. In such instance, as the trainee conducting the simulated examination moves the associated ultrasound probe to a location on the manikin's body at which a given internal organ would otherwise be located within a patient, the audio-enhanced ultrasound data associated with such internal organ may be displayed/broadcasted to the trainee. Specifically, the moving ultrasound image(s) of the functioning internal organ may be displayed on a display associated with the ultrasound simulation device while the synced audio may be simultaneously broadcast via a speaker(s) associated with the ultrasound simulation device. As a result, an improved, more realistic learning experience may be provided to the trainee that allows for enhanced instruction regarding the physiologic and pathophysiologic functions of human organs, the use of clinical ultrasound as an aid in diagnosis and treatment and the required methodology to become competent in the application of ultrasound technology when conducting a physical exam.

It should be appreciated that, although the present subject matter will be described herein with reference to the performance of simulated ultrasound examinations using manikins, the audio-enhanced ultrasound data described herein may generally be utilized with any suitable type of ultrasound learning or training, including computer simulations performed on a given computing device (e.g., a desktop, laptop, tablet, smartphone, etc.) without the use of manikin and recorded simulations displayed to the trainee via any suitable video format (e.g., a DVD).

Referring now to FIG. 1, an example view of one embodiment of a system 100 for performing simulated ultrasound examinations using audio-enhanced ultrasound data is illustrated in accordance with aspects of the present subject matter. As shown, the system 100 may include an ultrasound simulation device 102 that allows a technician or trainee to view a pre-recorded, moving ultrasound image(s) of an internal organ while synced audio data associated with the auscultatory sounds generated by such organ is being broadcast to the trainee. For example, the ultrasound simulation device 102 may be coupled to a display 104 for displaying the moving ultrasound image(s). In addition, the ultrasound simulation device 102 may be coupled to one or more speakers 106 to allow the pre-recorded, synced auscultatory sounds to be broadcast simultaneously with the moving ultrasound image(s). As shown in FIG. 1, the speakers 106 are integrated into or otherwise attached to the display 104. However, in other embodiments, each speaker 106 may correspond to a stand-alone speaker.

As shown in FIG. 1, when performing the examination, the trainee may use an ultrasound probe 108 to simulate the performance of an ultrasound examination on a given internal organ by placing the probe 108 at the appropriate location on a corresponding simulation manikin 110. For example, if it is desired to simulate the performance of an ultrasound examination on a heart, the trainee may place the ultrasound probe 108 at the appropriate location on the manikin's chest. Upon detecting that the probe 108 is appropriately positioned for examining the heart or upon receiving any other suitable input associated with initiating the examination, the ultrasound simulation device 102 may cause a moving ultrasound image(s) of a heart to be displayed on the display 104 while the corresponding synced audio is played through the speaker(s) 106. The trainee may then view the moving ultrasound image(s) of the heart while simultaneously listening to the corresponding auscultatory sounds generated by the depicted heart.

It should be appreciated that, in several embodiments, the ultrasound probe 108 used to perform the simulated ultrasound examination may correspond to an actual ultrasound probe configured to be used with any suitable clinical ultrasound unit. Alternatively, the ultrasound probe 108 may correspond to any other suitable object that can be held by the trainee during the performance of the simulated ultrasound examination. For instance, in one embodiment, the ultrasound probe 108 may correspond to a handheld device that is capable of detecting its location relative to the manikin 110 (e.g., by being configured to receive signals from suitable positioning devices implanted within or otherwise associated with the manikin 110). In such an embodiment, the ultrasound probe 108 may be configured to transmit suitable signals to the ultrasound simulation device 102 corresponding to the specific location of the probe 108 relative to the manikin 110. The ultrasound simulation device 102 may then determine which audio-enhanced ultrasound data to display/broadcast to the trainee base on the position of the probe 108.

As an alternative to determining which audio-enhanced ultrasound data to display/broadcast based on signals received from the ultrasound probe 108, the ultrasound simulation device 102 may be configured to select the appropriate data to output based on any other suitable input signal or means. For instance, the trainee may indicate that he/she desires to perform a simulated ultrasound examination on a particular organ by providing a suitable input to the ultrasound simulation device 102 (e.g., by using an input device(s) coupled to the ultrasound simulation device 102, such as a keyboard 112, a mouse or any other suitable input device). The ultrasound simulation device 102 may then display/broadcast the audio-enhanced ultrasound data associated with the internal organ selected based on the trainee's input(s).

Referring now to FIG. 2, a schematic view of one embodiment of various components that may be included within or coupled to an ultrasound simulation device 102 of the disclosed system 100 are illustrated in accordance with aspects of the present subject matter. Generally, the various components shown in FIG. 2 may include a combination of hardware, software and/or firmware elements, all of which either correspond to physical tangible apparatuses or which are embedded as instructions on a physical and tangible apparatus, such as a computer-readable storage medium. It should be appreciated that the components shown in FIG. 2 may be provided in different configurations and may be provided with different arrangements of direct and/or indirect physical and communicative links to perform the desired functionality of such components.

In several embodiments, the ultrasound simulation device 102 may correspond to any suitable processor-based device known in the art, such as a computing device or any suitable combination of computing devices. Thus, as shown in FIG. 2, the ultrasound simulation device 102 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 122 of the ultrasound simulation device 102 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 122 may generally be configured to store suitable computer-readable instructions that, when implemented by the processor(s) 120, configure the ultrasound simulation device 102 to perform various computer-implemented functions, such as facilitating the performance of audio-enhanced, simulated ultrasound examinations.

As shown in FIG. 2, in several embodiments, the memory device(s) 122 associated with the ultrasound simulation device 120 may be configured to store pre-recorded ultrasound data 124 that was obtained during the performance of one or more actual ultrasound examinations. For example, as indicated above, audio-enhanced ultrasound data may be collected from patients or other human subjects using an ultrasound unit, together with a unidirectional microphone, to obtain a moving ultrasound image(s) of one or more internal organs together with the auscultatory sounds generated by the examined organ(s) while the ultrasound image(s) were being recorded. The resulting ultrasound image(s) and synced audio may then be combined to create an audio-enhanced ultrasound data file that may be transmitted to and/or stored within the memory device(s) 122 of the ultrasound simulation device 102.

It should be appreciated that, in several embodiments, audio-enhanced ultrasound data may be stored within the memory device(s) 122 of the ultrasound simulation device 102 that is associated with a plurality of different internal organs. For example, audio-enhanced ultrasound data may be obtained from actual ultrasound examinations performed on a patient's heart, lungs, bowels, blood vessels and/or any other suitable internal organ. In such instance, each recording made of a given internal organ may be stored within the memory device(s) 122 as separate data file, with each data file including a moving ultrasound image(s) of the examined organ together with its synced audio data.

It should also be appreciated that a plurality of different data files may be stored within the memory device(s) 122 for a given internal organ. For instance, audio-enhanced ultrasound data associated with a particular organ may be collected from a plurality of patients having differing medical conditions. In such instance, the audio-enhanced ultrasound data collected from the patients may be selected for inclusion within the ultrasound simulation device 102 based on its ability to assist the trainee in recognizing and diagnosing specific medical conditions. For instance, a plurality of different data files associated with examinations of a human heart may be stored within the memory device(s) 122, with each data file including visual and/or audible evidence of a specific medical condition. As a result, a trainee may, for example, be exposed to multiple different medical conditions for each internal organ being examined, thereby enhancing the overall learning experience for the trainee.

Additionally, it should be appreciated that, as an alternative to the collecting the audio-enhanced ultrasound data from actual ultrasound examinations, all or a portion of such data may be computer-generated. For example, in one embodiment, an actual moving ultrasound image of a given internal organ may be combined with computer-generated audio that mimics the sound generated by the organ.

Referring still to FIG. 2, as indicated above, the ultrasound simulation device 102 may also be coupled to one or more output devices, such as a display 104 and one or more speakers 106. The display 104 may generally correspond to any suitable monitor, screen or other output device for presenting visual information to the trainee. For example, in one embodiment, the display 104 may simply correspond to a computer screen coupled to the ultrasound simulation device 102. Alternatively, the display 104 may correspond to any other suitable display device, such as a light-emitting diode (LED) display, electroluminescent display (ELD), plasma display panel (PDP) or liquid crystal display (LCD). Similarly, the speaker(s) 106 may generally correspond to any suitable audio output device capable of broadcasting audible information to the trainee. For example, one embodiment, the speaker(s) 106 may correspond to any compact, high power audio output device(s).

As indicated above, the ultrasound simulation device 102 may generally be configured to output audio-enhanced ultrasound data associated with a given internal organ via the display 104 and associated speaker(s) 106. Specifically, when the trainee desires to perform a simulated ultrasound examination on a particular organ, the ultrasound simulation device 102 may be configured to output a moving ultrasound image of the organ for presentation on the display 104 while simultaneously broadcasting the associated auscultatory sounds via the speaker(s) 106, thereby allowing the trainee to perform both a visual and audible examination on the organ.

Additionally, as shown in FIG. 2, the ultrasound simulation device 102 may also be coupled to one or more input devices 124 to allow the trainee to provide user inputs to the device 102. For example, in one embodiment, a touch screen may be integrated into or otherwise associated with the display 104 to allow the trainee to provide inputs to the ultrasound simulation device 102 using his/her hand(s) and/or a stylus. In addition, or as an alternative thereto, a peripheral keyboard and/or mouse (e.g., the keyboard 112 shown in FIG. 1) may be coupled to the ultrasound simulation device 102 to allow the trainee to provide user inputs.

Moreover, the ultrasound simulation device 102 may also be coupled to any other suitable input device(s) 126. For example, as indicated above, in one embodiment, the ultrasound probe 108 used to perform the simulated ultrasound examination may be communicatively coupled to the ultrasound simulation device 102. In such an embodiment, the ultrasound probe 108 may be configured to transmit input signals to the ultrasound simulation device 102 associated with the position of the probe 108 relative to the manikin 110. For instance, the ultrasound probe 108 may transmit a signal to the ultrasound simulation device 102 indicating that the probe 108 is positioned directly over the manikin 110 at a location corresponding to the location of a human liver. In such instance, the ultrasound simulation device 102 may then output a moving ultrasound image of a liver together with its synced audio data.

It should be appreciated that the various components shown in FIG. 2 are simply illustrated as one example of suitable components that may be included within or coupled to the ultrasound simulation device 102. In other embodiments, the ultrasound simulation device 102 may include or be coupled to any other suitable combination of components. For example, if the ultrasound simulation device 102 is also configured to serve as an ultrasound unit for performing actual ultrasound examinations, the ultrasound simulation device 102 may include or be coupled to any suitable components that allow the device 102 to function as a clinical ultrasound unit.

Referring now to FIG. 3, a flow diagram of one embodiment of a method 200 for performing audio-enhanced, simulated ultrasound examinations is illustrated in accordance with aspects of the present subject matter. In general, the method 200 will be described herein with reference to the system 100 and ultrasound simulation device 102 described above with reference to FIGS. 1 and 2. However, it should be appreciated by those of ordinary skill in the art that the disclosed method 200 may generally be utilized with any suitable system and/or any suitable ultrasound simulation device to allow for the performance of an audio-enhanced, simulated ultrasound examination. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 3, at (202), the method 200 includes receiving audio-enhanced ultrasound data. Specifically, as indicated above, the ultrasound simulation device 102 may be configured to receive pre-recorded, audio-enhanced ultrasound data collected during actual ultrasound examinations performed on one or more patients or other human test subjects. For example, when the audio-enhanced ultrasound data is initially collected, it may be stored within a memory device(s) associated with the ultrasound unit(s) used to perform the actual ultrasound examination(s). The data may then be subsequently transmitted to and stored within the memory device(s) 122 of the ultrasound simulation device 102 (e.g., by transmitting the data to the ultrasound simulation device 102 over a network or by using a memory storage device, such as flash drive or a compact disc). Alternatively, if the ultrasound simulation device 102, itself, corresponds to an ultrasound unit configured to perform actual ultrasound examinations, the audio-enhanced ultrasound data collected during the examination(s) may be immediately stored within the device's memory 122. Thereafter, when the ultrasound simulation device 102 is subsequently being used to perform a simulated ultrasound examination, the device 102 may be configured to simply access the previously stored data.

Additionally, at (204), the method 200 includes receiving an indication that a simulated ultrasound examination of a particular internal organ is to be performed. In general, the ultrasound simulation device 102 may be configured to receive any suitable input signal providing an indication that a trainee desires to perform a simulated ultrasound examination. For example, in one embodiment, the indication may correspond to an input signal provided by the trainee (e.g., via a keyboard, mouse or any other suitable input device) that instructs the ultrasound simulation device 102 to open a particular software program stored on the device 102 that allows for the performance of simulated ultrasound examinations. Alternatively, the indication may correspond to an input signal provided by the trainee that instructs the ultrasound simulation device 102 to initiate a simulated ultrasound examination. For instance, the trainee may provide an input signal instructing the device 102 to initiate a simulated ultrasound examination for a particular organ, such as by using a keyboard or mouse coupled to the ultrasound simulation device 102 to select an organ to be examined. In another embodiment, such input signal may derive from the ultrasound probe 108 that is to be used to perform the simulated ultrasound examination. For example, the trainee may place the ultrasound probe 108 at a particular location on the manikin 110 in order to indicate to the ultrasound simulation device 102 that a simulated ultrasound examination of the organ associated with the selected location on the manikin 110 is desired to be performed.

Referring still to FIG. 3, at (206), the method 200 includes displaying a moving ultrasound image of the internal organ. Specifically, as indicated above, the ultrasound simulation device 102 may be communicatively coupled to a display 104 configured to display visual information to the trainee. Thus, upon receipt of the indication that a simulated ultrasound examination of a particular internal organ is to be performed, the ultrasound simulation device 102 may be configured to present a moving ultrasound image of the organ to the trainee via the display 104.

In addition, at (208), the method 200 includes broadcasting synced audio data of the internal organ simultaneously with the display of the moving ultrasound image. Specifically, as indicated above, the ultrasound simulation device 102 may be communicatively coupled to a speaker(s) 106 configured to output audio associated with the auscultatory sounds generated by the organ depicted in the moving ultrasound image as such ultrasound image was being initially being recorded. As a result, by simultaneously broadcasting the synced audio data with the displayed ultrasound image, the trainee may be allowed to conduct both a visual and audible examination of the associated internal organ.

It should be appreciated that, although the present subject matter has generally been described herein with reference to performing simulated ultrasound examinations on internal organs by combining moving ultrasound images of the organs together with their synced audio data, the disclosed system 100 and method 200 may generally be used to perform any suitable simulated ultrasound examination. For example, recordings of vascular sounds, fetal sounds, and/or the like may be combined with their corresponding moving ultrasound images to produce audio-enhanced ultrasound data, which may then be used during the performance of a simulated ultrasound examination. It should be also be appreciated that, in addition to simulated ultrasound examinations on humans, the disclosed system 100 and method 200 may also be utilized to perform audio-enhanced, simulated ultrasound examinations on animals.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for performing audio-enhanced, simulated ultrasound examinations, the system comprising:
   an ultrasound simulation device configured to assist in the performance of a simulated ultrasound examination, the ultrasound simulation device including at least one processor and associated memory, the memory storing audio-enhanced ultrasound data for at least one internal organ, the audio-enhanced ultrasound data including a moving ultrasound image of the at least one internal organ along with synced audio data, the synced audio data including auscultatory sounds generated by the at least one internal organ depicted within the moving ultrasound image;

a display coupled to the ultrasound simulation device, the display being configured to display the moving ultrasound image as a trainee is performing the simulated ultrasound examination; and a speaker coupled to the ultrasound simulation device, the speaker being configured to broadcast the synced audio data as the trainee is performing the simulated ultrasound examination, wherein the ultrasound simulation device is configured to transmit the audio-enhanced ultrasound data to the display and the speaker such that, when the moving ultrasound image is presented on the display and the synced audio data is simultaneously broadcast via the speaker, the auscultatory sounds generated by the at least one internal organ depicted within the moving ultrasound image are synchronized with the associated movements of the at least one internal organ as presented on the display, wherein the at least one internal organ comprises a first internal organ, wherein the audio-enhanced ultrasound data includes a plurality of different moving ultrasound images for the first internal organ along with synced audio data associated with the auscultatory sounds generated by the first internal organ within each moving ultrasound image, wherein the audio-enhanced ultrasound data corresponds to ultrasound data obtained during an actual ultrasound examination of a human.

2. The system of claim 1, wherein the audio-enhanced ultrasound data includes moving ultrasound images and corresponding synced audio data for a plurality of different internal organs.

3. The system of claim 1, wherein each corresponding pair of moving ultrasound images and synced audio data contains at least one of visual evidence or audible evidence of a different medical condition associated with the first internal organ.

4. The system of claim 1, wherein the at least one internal organ comprises a heart.

5. The system of claim 1, wherein the at least one internal organ comprises at least one of a heart, a lung or bowels.

6. The system of claim 1, further comprising an ultrasound probe configured to be held by the trainee during performance of the simulated ultrasound on an associated manikin.

7. The system of claim 6, wherein the ultrasound probe is coupled to the ultrasound simulation device, the ultrasound probe being configured to transmit signals to the ultrasound simulation device associated with a position of the ultrasound probe relative to the manikin.

8. A method for performing audio-enhanced, simulated ultrasound examinations, the method comprising:

receiving, with a computing device, an indication that a simulated ultrasound examination is to be performed, the simulated ultrasound examination being associated with an internal organ;

retrieving, with the computing device, audio-enhanced ultrasound data for the internal organ, the audio-enhanced ultrasound data including a moving ultrasound image of the internal organ along with synced audio data, the synced audio data including auscultatory sounds generated by the internal organ depicted within the moving ultrasound image;

transmitting, with the computing device, the moving ultrasound image for display as the simulated ultrasound examination is being performed; and transmitting, with the computing device, the synced audio data for broadcast as the simulated ultrasound examination is being performed, wherein, when the moving ultrasound image is displayed and the synced audio data is simultaneously broadcast as the simulated ultrasound examination is being performed, the auscultatory sounds generated by the internal organ depicted within the moving ultrasound image are synchronized with the associated movements of the internal organ as displayed, wherein the audio-enhanced ultrasound data includes a plurality of different moving ultrasound images for the internal organ along with synced audio data associated with the auscultatory sounds generated by the internal organ with each moving ultrasound image, wherein the audio-enhanced ultrasound data corresponds to ultrasound data obtained during an actual ultrasound examination of a human.

9. The method of claim 8, further comprising receiving the audio-enhanced ultrasound data for storage within memory of the computing device.

10. The method of claim 8, wherein the audio-enhanced ultrasound data includes moving ultrasound images and corresponding synced audio data for a plurality of different internal organs.

11. The method of claim 8, wherein each corresponding pair of moving ultrasound images and synced audio data contains at least one of visual evidence or audible evidence of a different medical condition associated with the internal organ.

12. The method of claim 8, wherein the simulated ultrasound examination is being performed using an ultrasound probe with an associated manikin, further comprising receiving, with the computing device, input signals from the ultrasound probe associated with a position of the ultrasound probe relative to the manikin.

13. The method of claim 8, wherein the at least one internal organ comprises at least one of a heart, a lung or bowels.

14. The method of claim 8, further comprising displaying the moving ultrasound image on a display coupled to the computing device.

15. The method of claim 8, further comprising broadcasting the synced audio data with a speaker coupled to the computing device.

* * * * *